United States Patent [19]

Klees et al.

[11] Patent Number: 5,129,227
[45] Date of Patent: Jul. 14, 1992

[54] LOW SPEED ENGINE FOR SUPERSONIC AND HYPERSONIC VEHICLES

[75] Inventors: Garry W. Klees, Mercer Island; Mark L. Sloan, Renton; Russel L. Thornock, Seattle, all of Wash.

[73] Assignee: The Boeing Company, Seattle, Wash.

[21] Appl. No.: 683,350

[22] Filed: Apr. 10, 1991

Related U.S. Application Data

[63] Continuation of Ser. No. 254,207, Oct. 6, 1988, abandoned.

[51] Int. Cl.$^5$ ................................................ F02K 7/10
[52] U.S. Cl. ........................................ 60/264; 60/270.1; 60/746
[58] Field of Search ............... 60/267, 269, 270.1, 60/737, 738, 746

[56] References Cited

U.S. PATENT DOCUMENTS

| | | | |
|---|---|---|---|
| 3,323,304 | 6/1967 | Llobet et al. | 60/269 |
| 3,667,233 | 6/1972 | Curran et al. | 60/270.1 |
| 3,690,102 | 9/1972 | DuPont | 60/269 |
| 3,768,257 | 10/1973 | Neuffer | 60/269 |
| 3,841,090 | 10/1974 | Sharpe | 60/269 |
| 4,644,746 | 2/1987 | Hartman | 60/269 |

OTHER PUBLICATIONS

*G8-2 Technical Handbook*, EMG Engineering Co., P.O. Box 1368, Hesperia, Calif. 92345 (Revised 1985).

*Primary Examiner*—Louis J. Casaregola
*Attorney, Agent, or Firm*—Seed and Berry

[57] ABSTRACT

A jet engine for use in a hypersonic aircraft. A fuel rich injectant is injected into the mixing zone of a duct at a substantial downstream angle to form an ejector. The temperature of the injectant is sufficiently low that spontaneous combustion of the injectant is delayed until the injectant reaches the combustion zone of the duct. In order to prevent combustion from propagating upstream from the combustion zone, the equivalence ratio of the mixture of injectant and ambient air flowing along the wall of the duct is maintained at a relatively high value, and the velocity profile of the flow along the wall of the duct is maintained at a relatively high value.

4 Claims, 4 Drawing Sheets

LOW SPEED ENGINE FOR SUPERSONIC AND HYPERSONIC VEHICLES

This application is a continuation of U.S. patent application Ser. No. 07/254,207 filed Oct. 6, 1988, now abandoned under C.F.R. §1.62.

DESCRIPTION

1. Field of the Invention

This invention relates to jet engines for aircraft, and, more particularly, to engines for supersonic and hypersonic aircraft that are required to generate adequate thrust at zero or relatively low speeds typical of takeoff and landing as well as at maximum aircraft speed.

2. Background Art

Jet aircraft can be classified according to their normal range of cruise speeds. Subsonic aircraft cruise at speeds below the speed of sound, and they are generally powered by turbojet or turbofan engines. Supersonic aircraft can cruise at speeds above the speed of sound, although they can, of course, also fly at subsonic speeds. Supersonic aircraft can utilize turbojet engines in the low supersonic range, but at higher supersonic speeds, e.g., above MACH 3 or 4, and at hypersonic speeds (approximately above MACH 6) ramjet engines are more advantageously used. Turbojet engines have rotating compressor blades that are used to compress the inlet air prior to combustion. At higher supersonic speeds, excessive aerodynamic heating of the turbojet compressor blading occurs, and the turbojet system becomes impractical to achieve full and optimal compression of the air stream, which is necessary for cycle operation.

Ramjet engines, unlike turbojet engines, do not have rotating compressor blades. Instead, they basically consist of a tubular duct having an air inlet at its leading end, an exhaust outlet at its trailing end and an intermediate combustion zone into which fuel is injected. Flameholders normally project into the duct near the combustion zone to ignite the fuel. Ramjet engines depend upon the force of the ram air into the inlet to compress the combustion air. Thus, at higher supersonic speeds, the compressor blades used in turbojet engines are neither necessary nor desired. However, at or below low supersonic speeds, the air is not compressed sufficiently to provide efficient operation, and the ramjet is inefficient.

Hypersonic aircraft are generally classified as aircraft that have maximum speed above about MACH 6. Hypersonic aircraft are expected to use scramjet engines for propulsion. Scramjet engines are a type of ramjet engine in which the air flowing through the engine is not slowed by ram compression to subsonic speeds prior to combustion as it is in a conventional ramjet engine. Thus, in a scramjet engine, combustion occurs at supersonic speed. Subsonic ramjet engines generally cannot be used above about MACH 6 since it is then not possible to slow the inlet air to subsonic speeds prior to combustion without undue structural heating and excessive losses in total pressure (increase in entropy or nonavailability of the energy of the gas stream). Scramjet engines do not operate well below about MACH 4.

Propulsion systems for supersonic and hypersonic aircraft must be capable of operating throughout the entire range between low subsonic (needed for takeoff and landing) and hypersonic. One approach that has been proposed for a supersonic or hypersonic engine capable of operating at relatively low speeds is jet engine, preferably of the a ramjet or scramjet variety having an ejector in which fuel or an oxidizer/fuel mixture is injected into the ramjet duct at an angle having a component extending downstream along the longitudinal axis of the ramjet duct. As a result, the kinetic energy and momentum of the injected flow is partially transferred to the entrained flow. The ejector acts as a compressor for the entrained flow. This function is particularly advantageous at low speeds since the ram air effect is not sufficient to adequately compress the entrained airflow. The resulting mixed flow may have a higher thrust than the sum of the thrusts of the ramjet engine and injector separately. Two conventional implementations of this ejector-ramjet concept are the Simultaneous Mix, Diffuse and Burn (SimulMDB) ejector-ramjet engine and Sequential Mix, Diffuse and Burn (SeqMDB) ejector-ramjet engine with stoichiometric injection.

The SimulMDB ejector-ramjet engine utilizes an injector having a chamber receiving both an oxidizer, such as onboard liquid oxygen, and a fuel, such as hydrogen. Combustion occurs in the chamber, at high pressure, and the exhaust gases are injected into the ramjet duct along the longitudinal axis of the ramjet duct to form an ejector. As a result, the kinetic energy and momentum of the injected flow is transferred to the entrained flow, and the thrust of the mixed flow can be higher than the sum of the thrusts of the ramjet and injector operating separately. The gases from the injector into the ramjet duct are fuel rich so that further combustion of the remaining fuel occurs in the ramjet duct as the injectant mixes and diffuses with the air entering the inlet of the ramjet duct. Thus, mixing, diffusion and burning of the injectant occurs simultaneously and all the fuel is used to drive the ejector.

It will be apparent to one skilled in the art that the SimulMDB ejector-ramjet engine differs from a conventional ramjet engine in that the fuel rich hydrogen/oxidizer mixture is injected into the ramjet duct substantially along the longitudinal axis of the ramjet duct to form an ejector. As a result, the momentum of the fuel/oxidizer injectant mixture is preserved in the SimulMDB engine. In contrast, in conventional ramjet engines most of the fuel is injected into the ramjet duct perpendicular to its longitudinal axis. As a result, the momentum of the fuel mixture is not preserved.

A disadvantage of the SimulMDB engine is that it inherently requires tradeoffs that prevent optimum efficiency. As is well known in the art, heat added to gases flowing through the combustion zone of a ramjet duct reduces the total pressure of the gases exiting the duct thereby resulting in a reduction in thrust. These losses, known in the art as "Rayleigh losses", can be minimized by increasing the diameter of the ramjet duct in the combustion zone. However, as is also well known in the art, the thrust created by an ejector-ramjet is decreased if the diameter of the ramjet duct is increased in the mixing zone forming part of the ejector. Thus, in the SimulMDB engine where the same portion of the ramjet duct is used as both the mixing zone and the combustion zone, increasing the diameter of the ramjet duct to reduce the Rayleigh losses also reduces the benefits of using an ejector in the SimulMDB engine.

It would be possible to reduce the Rayleigh losses while maintaining efficient ejector operation if the fuel/oxidizer injectant mixture could be injected at a location in the ramjet duct that was different from the location where combustion of the injectant occurs. The combustion zone would then be separate from the mixing zone. As a result, the diameter of the duct in the mixing zone could be made relatively small to optimize the ejector design, and the diameter of the ramjet duct in the combustion zone could be made relatively large to minimize the Rayleigh losses. Unfortunately, it is well recognized by those skilled in the art that it is not possible to separate the mixing and combustion zones when a fuel rich mixture in used as the injectant. The fuel rich nature of the injectant would normally cause the fuel/air mixture to immediately burn either by spontaneous ignition or by flame propagation from any downstream combustion region to the mixing zone thereby inherently making the mixing zone also the combustion zone. In other words, it is well recognized that injecting a fuel rich mixture into a ramjet duct inherently produces simultaneous mixing, diffusion and burning.

The SeqMDB ejector-ramjet with stoichiometric injectant does separate the mixing zone from the combustion zone. Like the SimulMDB engine, the SeqMDB engine uses an injector having a combustion chamber receiving fuel and an oxidizer. Combustion of the fuel/oxidizer mixture occurs in the chamber, and the exhaust gases are injected from the chamber into the ramjet duct along its longitudinal axis to form an ejector so that the momentum of the injectant is preserved. However, unlike the SimulMDB engine, the fuel/oxidizer mixture injected into the ramjet duct in the SeqMDB engine is stoichiometric so that complete combustion has occurred by the time the exhaust gases have been injected into the ramjet duct. As a result, no combustion occurs in the mixing or diffusion zone, and the diameter of the ramjet duct in the mixing zone can be optimized for best ejector performance.

The SeqMDB engine utilizes a separate combustion zone downstream from the mixing zone that forms a part of the ejector. If the injectant is a stoichiometric mixture of fuel/oxidizer, additional fuel must be added to the mixture of ambient air and injectant in order to achieve combustion in the combustion zone since there is no unburned fuel in the injectant. This fuel is typically injected into the ramjet duct nearly perpendicular to the longitudinal axis of ramjet duct to promote rapid mixing. As a result, the momentum of that fuel is not preserved and thus does not add to the thrust of the engine. However, efficient thrust augmentation would not occur even if the fuel was injected along the longitudinal axis of the ramjet duct to form an ejector in the combustion zone since the diameter of the ramjet duct in the combustion zone is relatively large in order to minimize the Rayleigh losses. Injecting the fuel into the combustion zone along the longitudinal axis of the ramjet duct would, therefore, result in the same tradeoffs between momentum preservation and Rayleigh losses that are inherent in the SimulMDB engine. The SeqMDB approach with stoichiometric injectant thus also fails to efficiently use the momentum of all of the injected fuel.

As is apparent from the above description, conventional wisdom holds that the use of ejector-ramjet technology inherently involves performance compromises. If the SimulMDB concept is employed and a fuel rich mixture is ejected into the primary airstream, then combustion must occur in the mixing zone so that the design of the ramjet duct in this zone cannot be optimized for both ejection and combustion. Further, according to conventional wisdom, combustion of the injectant in the mixing zone can be avoided only by using the SeqMDB concept with stoichiometric injectant driving the ejector so that there is no fuel left in the injectant to burn. However, this approach requires that fuel be added downstream in the combustion zone, and the momentum of that fuel cannot be efficiently used.

DISCLOSURE OF THE INVENTION

It is an object of the invention to provide a jet aircraft engine that is capable of efficient operation over a range of speeds from low subsonic through supersonic and hypersonic.

It is another object of the invention to provide a jet engine in which a fuel rich mixture can be injected into the primary airstream in a mixing zone without allowing combustion of the injectant in the mixing zone.

It is another object of the invention to provide a jet engine having separate mixing and combustion zones so that both zones can be optimized for their respective functions.

It is another object of the invention to provide a jet engine that is capable of efficient operation yet is relatively light in weight.

It is a another object of the invention to provide a jet engine for hypersonic aircraft that requires a minimum amount of oxidizer.

These and other objects of the invention are provided by a SeqMDB ejector-jet engine with fuel rich injection that is suitable for use in an aircraft in a range of speeds from zero through hypersonic flight. The engine includes an ejector-jet having a relatively small diameter duct in the mixing zone and a relatively large diameter combustion zone located downstream from the mixing zone. An injector having an exhaust nozzle opens into the duct in the mixing zone. A fuel rich injectant, which may be either pure fuel or a pre-combusted mixture of fuel and an oxidizer, is supplied to the injector and injected into the duct through the exhaust nozzle in a direction extending substantially along the length of the duct to form an ejector. The fuel rich injectant is injected at a sufficiently low temperature that spontaneous combustion of the fuel and oxidizer is delayed until the injectant reaches the combustion zone. As a result, combustion of the injectant in the duct does not occur at the point of injection. The equivalence ratio profile of the ambient air/injectant mixture and the velocity flow profile through the duct are selected to prevent combustion from propagating through the duct upstream from the combustion zone. These equivalence ratio and velocity profiles which prevent combustion from propagating from the combustion zone upstream to the mixing zone may be generated and maintained in some cases only by design of the main injector and downstream duct contours. The engine may also include secondary injectors to generate and maintain the equivalence ratio and velocity profiles that prevent upstream propagation of combustion. The secondary injectors direct the injectant along the walls of the duct so that the flow velocity is everywhere higher than the local burning velocity as determined by the local equivalence ratio of the ambient air/injectant mixture along the walls of the duct. The secondary injectors thereby prevent combustion from propagating upstream from the combustion chamber. The secondary injectors may use a fuel rich injectant with an equivalence ratio that is larger than the equivalence ratio of the fuel rich injectant used by the primary injector. As a result, a layer of ambient air/injectant mixture having a relatively high equivalence ratio and flow velocity is created along the wall of the duct upstream from the combustion zone to prevent combustion from propagating along the wall of the duct upstream from the combustion zone.

The fuel rich injectant in the ejector may be the sole source of fuel for combustion, or additional fuel may be injected in the combustion chamber. The fuel may be heated by a combustion zone heat exchanger prior to being supplied to the injector thereby both increasing the efficiency of the injector and reducing the Rayleigh losses in the combustion zone. The oxidizer for the engine may be supplied to the injector from either an oxidizer storage tank or some other source.

The means of controlling combustion location by control of equivalence ratio profile and velocity profiles for the SeqMDB ejector-ramjet with fuel rich injection are also applicable to ejector-turbojet engine designs. Applying these control methods to ejector-turbojet engine designs allows that engine's ejector-combustor to also operate as a SeqMDB device with higher propulsive efficiency.

It is another object of the invention to provide an fuel-rich-ejector-combustor which can substitute for air-breathing applications other than ramjets which require compression of flow followed by combustion. A fuel rich ejector is used with combustion location control as described for the ejector-combustor in the ejector-ramjet. The inventive fuel-rich-ejector-combustor substituting for a compressor-combustor is more efficient than the prior art fuel-rich-ejector-combustors since control of combustion location allows ejector flow areas and combustion flow areas to be optimized separately.

BEST MODE FOR CARRYING OUT THE INVENTION

Figure 1:
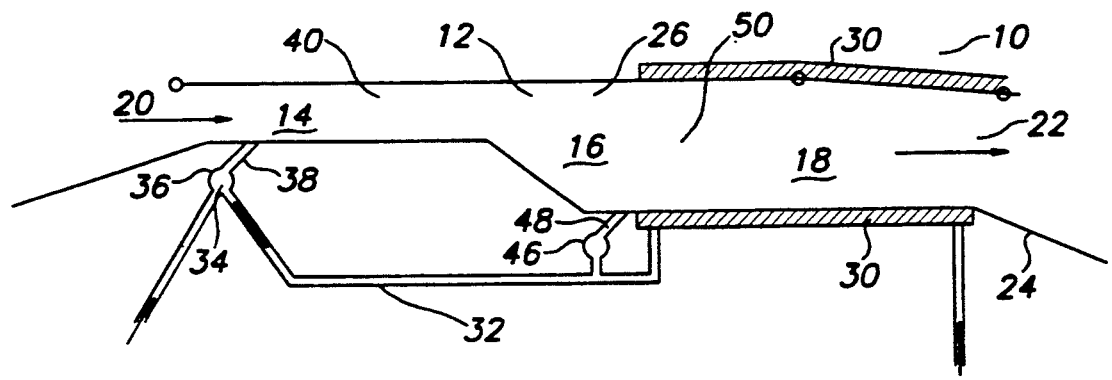
FIG. 1 is a schematic cross-sectional view of one embodiment of a conventional ramjet engine suitable for use in supersonic or hypersonic aircraft.

The basic concept of a conventional ramjet engine 10 operating with sequential mixing, diffusion and burning (SeqMDB) and stoichiometric injection is illustrated in FIG. 1. The engine 10 includes a ramjet duct 12 of conventional design having a mixing zone 14, a diffusion zone 16 and a combustion zone 18. Ambient air enters the ramjet duct 12 through an inlet 20, and exhaust gases exit the duct 12 through an outlet 22. The duct 12 is normally formed by an insulated skin 24 of the aircraft and an external cowling 26.

The SeqMDB engine 10 shown in FIG. 1 uses liquid hydrogen as its fuel and liquid oxygen as its oxidizer, although other fuels and oxidizers can be used. The hydrogen is pumped from a tank (not shown) through a heat exchanger 30 in thermal communication with the combustion zone 18 of the ramjet duct 12. The gaseous hydrogen from the heat exchanger 30 is conveyed through a conduit 32 along with oxidizer from a tank (not shown) to the combustion chamber 34 of an injector 36. The injector also includes an exhaust nozzle 38 opening into the mixing section 14 of the ramjet duct 12. The ratio of the fuel to the oxidizer conveyed to the combustion chamber 36 is controlled so that the combustion of the hydrogen and air in the chamber 36 is stoichiometric. As a result, there is no unburned hydrogen in the hydrogen/oxidizer exhaust gases passing into the mixing zone 14 of the ramjet duct 12 through the exhaust nozzle 38, and further combustion in the mixing zone 14 is thus not possible.

As shown in FIG. 1, the exhaust nozzle 38 of the injector 36 injects the exhaust gases into the mixing zone 14 in a direction having a substantial component extending downstream along the longitudinal axis of the ramjet duct 12. The injector 36 and mixing zone 14 portion of the ramjet duct 12 thus form an ejector 40. The ejector 40 substantially preserves the momentum of the exhaust gases passing through the nozzle 38 thereby increasing the thrust of the engine 10, particularly at low speeds before significant compression of the air entering the inlet 20 occurs. Furthermore, since no combustion occurs in the mixing zone 14, the diameter of the ramjet duct 12 in the mixing zone 14 can be made relatively small without increasing Rayleigh losses. The use of a relatively small diameter mixing zone 14 has the effect of providing a relatively efficient ejector 40 since, as mentioned above, the efficiency of an ejector can be increased by reducing the diameter of the duct into which exhaust gases are injected. It is, therefore, apparent that the use of separate mixing and combustion zones in a SeqMDB engine has the advantage of allowing optimization of the design of the ejector 40.

Although separating the mixing zone 14 from the combustion zone 18 has significant advantages, these advantages are not achieved without cost. Specifically, since the exhaust gases injected by the injector 36 contain no unburned fuel, it is necessary to inject additional fuel directly into the combustion zone 18 in order to have combustion in the zone 18 with the air entering the inlet 20. This additional fuel is also received from the heat exchanger 30, and it is injected through a second injector 46 having a nozzle 48 opening into the ramjet duct 12. Like the nozzle 38 of the first injector 36, the nozzle 48 of injector 46 injects the fuel into the ramjet duct 12 in a direction having a substantial component extending downstream along the longitudinal axis of the ramjet duct 12. The injector 46 and combustion zone 18 portion of the ramjet duct 12 thus form an ejector 50. However, the design of the ejector 50 cannot be optimized by reducing the diameter of the ramjet duct 12 in the combustion zone 18 without also increasing the Rayleigh losses. While injecting a fuel rich mixture through injector 36 would efficiently use the momentum of all the injectant, allow optimum ejector design and dispense with the need to inject fuel into the combustion zone 18, it is well known from experience with SimulMDB engines that it is not possible to eject a fuel rich mixture in a mixing zone and intentionally delay combustion of that mixture until it reaches the combustion zone 18.

Figure 2:
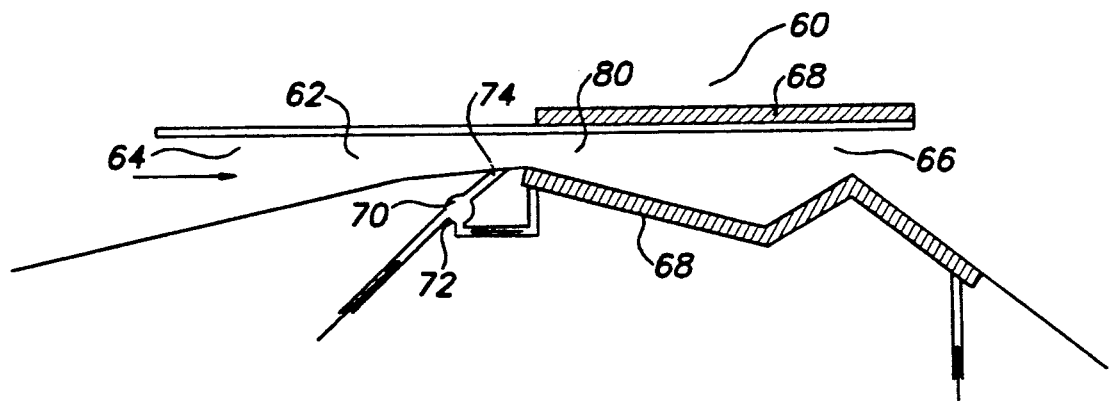
FIG. 2 is a schematic cross-sectional view of one embodiment of another type of conventional ramjet engine suitable for use in supersonic or hypersonic aircraft.

A typical embodiment of a Simultaneous Mix, Diffuse and Burn (SimulMDB) engine 60 is illustrated in FIG. 2. Like the SeqMDB engine 10 of FIG. 1, the SimulMDB engine 60 includes a ramjet duct 62 having an air inlet 64 and an exhaust outlet 66. Hydrogen from a tank (not shown) is also passed through a heat exchanger 68 and conveyed along with oxidizer from a tank (not shown) to the combustion chamber 70 of an injector 72. The injector 72 also includes an exhaust nozzle 74 opening into the ramjet duct 62. Combustion of the hydrogen and oxidizer occurs in the combustion chamber 70, and the exhaust gases are injected into the ramjet duct 62 through the exhaust nozzle 74. Unlike the stoichiometric combustion in the combustion chamber 34 of the SimulMDB engine 10 of FIG. 1, combustion of the hydrogen and oxidizer in the combustion chamber 70 is fuel rich so that there is substantial unburned fuel in the exhaust gases passing through the nozzle 74.

The exhaust nozzle 74, like the exhaust nozzle 38 in the SeqMDB engine 10 of FIG. 1, injects the exhaust gases into the ramjet duct 62 in a direction having a substantial component extending downstream along the longitudinal axis of the ramjet duct 62. The injector 72 and ramjet duct 62 thus form an ejector 80. However, the design of the ejector 80 cannot, as a practical matter, be optimized because the portion of the ramjet duct 62 forming the ejector 80 is also the combustion zone of the duct 62. It is thus not possible to reduce the diameter of the duct 62 to improve the efficiency of the ejector 80 without also increasing the Rayleigh losses by virtue of the smaller diameter combustion zone. A major disadvantage of the SimulMDB engine is this inherent tradeoff between maximizing the ejector efficiency and minimizing the Rayleigh losses. This tradeoff is the result of the mixing and combustion of the fuel rich mixture in the same portion of the ramjet duct 62 which, as well recognized in the art, is a necessary result of using a fuel rich mixture in an ejector for a ramjet engine.

Figure 3:
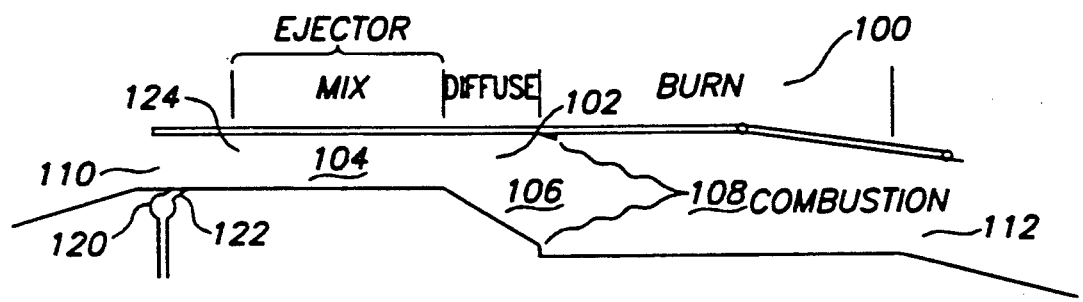
FIG. 3 is a schematic cross-sectional view of one embodiment of the inventive engine.

A basic embodiment of the inventive ejector-ramjet engine 100 is illustrated in FIG. 3. Although the inventive engine is illustrated herein in the form of a ramjet engine, it will be understood that the invention encompasses other varieties of jet engines including turbojet and scramjet engines. The inventive ejector-ramjet engine departs from conventional wisdom in that it actually injects a fuel rich mixture in a mixing zone of a ramjet duct and intentionally prevents combustion until the mixture reaches a combustion zone. As a result, it is possible to inject all of the fuel used by the engine using an ejector, to optimize the efficiency of the ejector, and to also minimize the Rayleigh losses during combustion of the fuel rich mixture.

With reference to FIG. 3, the inventive ramjet engine 100 includes a ramjet duct 102 having a mixing zone 104, a diffusion zone 106, and a combustion zone 108. As in the SeqMDB engine 10 (FIG. 1) and the SimulMDB engine 60 (FIG. 2), air enters the ramjet duct 102 through an air inlet 110, and exhaust gases exit the duct 102 through an exhaust outlet 112. A fuel rich mixture is injected into the mixing zone 104 of the ramjet duct 102 through an injector 120 having an exhaust nozzle 122. As explained in greater detail below, the inventive engine 100 prevents the fuel rich mixture injected through the exhaust nozzle 122 from burning as it enters the mixing zone 104 of the ramjet duct 102. The exhaust nozzle 122, like the exhaust nozzle 38 in the SeqMDB engine 10 of FIG. 1 and the exhaust nozzle 74 in the SimulMDB engine 60 of FIG. 2, injects the exhaust gases into the ramjet duct 102 in a direction having a substantial component extending downstream along the longitudinal axis of the ramjet duct 102. The injector 120 and mixing zone 104 of the ramjet duct 102 thus form an ejector 124. Since the mixing of the fuel rich mixture with the ambient air and the combustion of the fuel rich mixture occur in different zones of the ramjet duct 102, the design of the ejector 124 can be optimized without increasing the Rayleigh losses in the combustion zone 108. Specifically, the mixing zone 104 of the ramjet duct 102 can have a relatively small diameter to optimize the efficiency of the ejector 124 while the combustion zone 108 can have a relatively large diameter to minimize the Rayleigh losses.

As mentioned above, the engine 100 is able to provide separate mixing and combustion zones while injecting a fuel rich injectant into the mixing zone 104 because it is able to prevent combustion of the fuel rich injectant in the mixing zone 104. Combustion in the mixing zone is prevented by two essential operating techniques. First, the temperature of the fuel rich injectant is intentionally kept below the immediate self-ignition temperature of the fuel rich injectant. As a result, combustion of the fuel rich injectant is delayed until the injectant reaches the combustion zone 108, and combustion does not occur when the injectant enters the mixing zone 104 of the ramjet duct 102. Second, as explained in greater detail below, the flow characteristics and fuel concentration of the mixture of ambient air and fuel rich injectant flowing through the mixing zone 104 and/or diffusion zone 106 of the ramjet duct 102 are controlled to prevent combustion from propagating forwardly from the combustion zone 108 to the mixing zone 104. By these means, the flow velocity downstream of the injectors is maintained at a significantly greater velocity than the flame propagation velocity.

Upstream propagation of the combustion from the combustion zone 108, known as "flashback," occurs when any part of the flow has a velocity that is greater than the flame propagation velocity. The velocity of fluid flow through any duct normally approaches zero at the walls of the duct. Thus, the velocity of the ambient air/fuel mixture is at its lowest near the walls of the ramjet duct 102, and it is in this area that flashback can be expected to occur. Flashback cannot occur if the thickness of the flow of the relatively slow flowing combustible mixture is thinner than a predetermined value because the heat transfer to the wall of the ramjet duct 102 will maintain the temperature of the mixture below its combustion temperature. Thus, the ability of the duct wall to "quench" the combustion of the mixture can also be used to prevent flashback as long as the thickness of the slow portion of the combustible mixture is maintained at a relatively small value.

Figure 4:
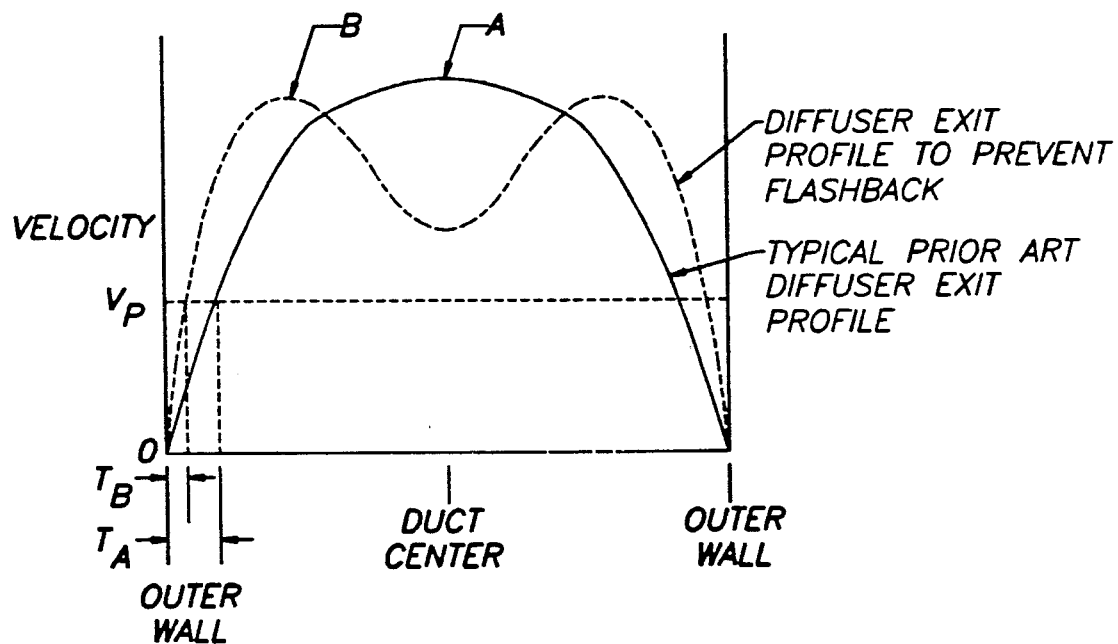
FIG. 4 is a graph of the flow profiles through a simple cylindrical duct and through the ramjet duct of the inventive engine.

The flow profiles for flow through a simple cylindrical duct and for the inventive engine are illustrated in FIG. 4. The flow of a fluid through a simple cylindrical duct follows profile "A" in which the flow velocity peaks at the center of the duct and quickly slopes to zero velocity at the walls of the duct. Assuming that the combustion propagation velocity is $V_P$ and a simple duct is used at the ramjet duct, then the thickness of the boundary layer in which the flow velocity is less than the propagation velocity $V_P$ is $T_A$. If the thickness $T_A$ is greater than the thickness at which quenching of combustion can occur, then combustion would propagate along the walls of the ramjet duct.

The ramjet duct 102 of the inventive engine 100 is designed using conventional flow control techniques to provide the flow profile "B" illustrated in FIG. 4. This flow profile may be achieved, for example, by aiming the upstream main injector flow closer to the wall than in the center of the duct 102. The profile "B" has a velocity minima at the center of the duct 102, but the velocity at this minima is still greater than the combustion propagation velocity $V_P$ so that flashback cannot occur through the center of the duct 102. Significantly, the thickness of the boundary layer in which the flow velocity is less than the propagation velocity $V_P$ is now $T_B$. This layer $T_B$ is substantially thinner than the layer $T_A$ for a simple cylindrical duct and can thus be made thinner than the thickness of the boundary layer at which quenching occurs. Wall quenching can be improved with regenerative wall cooling which would normally be required for scramjet operation.

Figure 5:
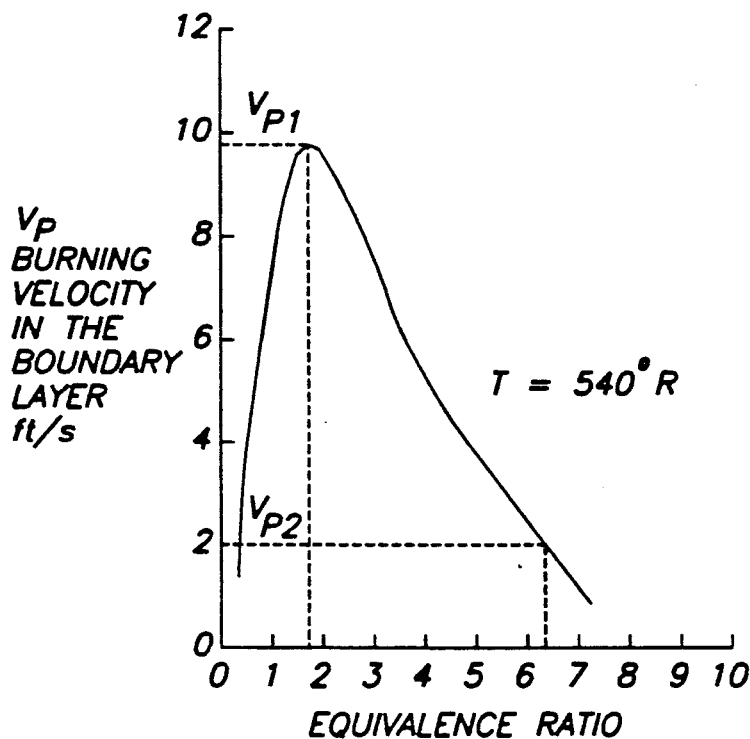
FIG. 5 is a graph of the flame propagation velocity of an air/fuel mixture used in the inventive engine as a function of fuel concentration.

As mentioned above, flashback can also be prevented by controlling the fuel concentration of the mixture of ambient air and injectant as it flows through the mixing zone 104 and diffusion zone of the ramjet duct 102. The propagation velocity $V_P$ as a function of fuel concentration (expressed as equivalence ratio) is illustrated in FIG. 5. The propagation velocity peaks at $V_{P1}$ for a fuel concentration equivalence ratio of about 2 and is reduced at higher or lower fuel concentrations. At very high or very low fuel concentrations, combustion does not occur at all. For example, the combustion propagation velocity $V_P$ at a fuel concentration equivalence ratio of 6 is only $V_{P2}$. Thus, by ensuring that the fuel concentration of the ambient air/injectant mixture has a relatively high equivalence ratio, e.g. 4-6, flame speed can be reduced and flashback prevented. The fuel concentration of the mixture in the ramjet duct 102 can also be tailored so that the fuel concentration is relatively high along the walls of the ramjet duct 102 where the flow velocity approaches zero and flashback is thus most likely to occur. In the embodiment of FIG. 3, a relatively high fuel concentration along the wall of the duct 102 is achieved by placing the nozzle 122 on the wall of the duct 102 so that the injectant has a substantial flow component along the wall of the mixing zone 104.

Figure 6:
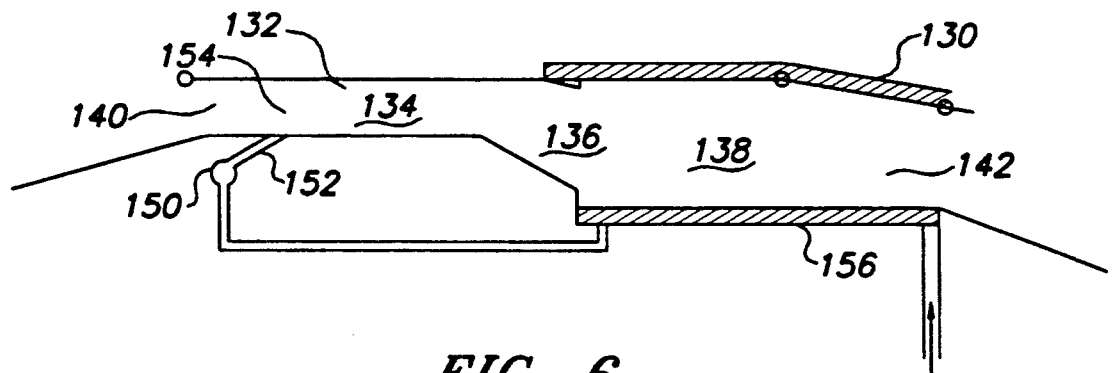
FIG. 6 is a schematic cross-sectional view of another embodiment of the inventive engine in which hydrogen fuel is heated by a heat exchanger in the combustion zone prior to being injected into the ramjet duct.

An alternative embodiment of an engine 130 of the present invention is illustrated in FIG. 6. Like the embodiment of FIG. 3, the engine 130 includes a ramjet duct 132 having a mixing zone 134, a diffusion zone 136, and a combustion zone 138. As in the embodiment of FIG. 3, air enters the ramjet duct 132 through an air inlet 140, and exhaust gases exit the duct 132 through an exhaust outlet 142. A fuel rich injectant is injected into the mixing zone 134 of the ramjet duct 132 through an injector 150 having an exhaust nozzle 152. The angle of the exhaust nozzle 152 has a substantial component extending downstream along the length of the ramjet duct 132 so that the injector 150, along with the portion of the duct 132 in the mixing zone 134, form an ejector 154.

The engine 130 shown in FIG. 6 differs from the engine 100 of FIG. 3 by passing the fuel through a conventional heat exchanger 156 prior to being conveyed to the injector 150. The heat exchanger 156 performs two functions. First, in transferring heat from the combustion zone 138 to the fuel, it reduces the Rayleigh losses in the combustion zone 138. Second, the heat energy transferred to the fuel increases the thrust per pound of flow from the injector to improve the efficiency of the ejector 154.

As in the engine 100 shown in FIG. 3, the engine 130 shown in FIG. 6 prevents combustion of the fuel rich mixture as it is injected into the mixing zone 134 by maintaining the temperature of the injectant below its combustion temperature. Also, flashback is prevented by maintaining a relatively high fuel concentration along the walls of the mixing zone 134 and/or diffusion zone 136, and/or by ensuring a relatively high flow velocity near the walls of the ramjet duct 132 so that combustion in the relatively thin portion of the boundary layer in which the flow velocity is less than the combustion propagation velocity is quenched by the walls of the ramjet duct 132.

Figure 7:
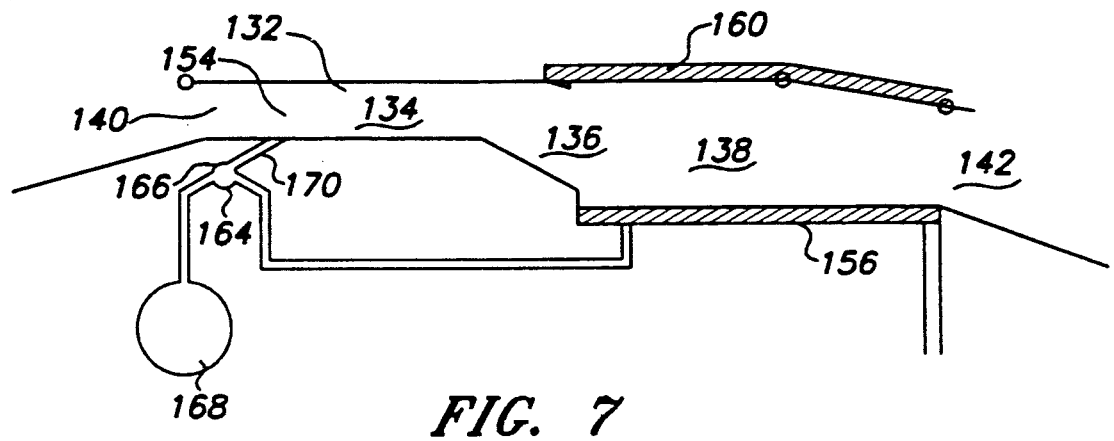
FIG. 7 is a schematic cross-sectional view of another embodiment of the inventive engine in which hydrogen fuel is heated by combustion with liquid oxygen prior to being injected into the ramjet duct.

Another embodiment of an engine 160 of the present invention is illustrated in FIG. 7. The engine 160 is essentially the same as the engine 130 of FIG. 6. For this reason, components that are the same in both engines have been given the same reference numerals. Also, for the sake of brevity, a description of these components will not be repeated with reference to FIG. 7. The ramjet engine 160 of FIG. 7 differs from the engine 130 of FIG. 6 in that it utilizes an injector 164 having a combustion chamber 166 receiving not only fuel from the heat exchanger 156, but also liquid oxygen from a tank 168. Combustion of the oxygen and fuel occurs in the combustion chamber 166, and exhaust gases are injected into the mixing zone 134 through an exhaust nozzle. Even though combustion occurs in the combustion chamber 166, the mixture injected into the mixing zone 134 is fuel rich so that further combustion occurs downstream in the combustion zone 138. As in the other embodiments, combustion of the fuel rich injectant as it is injected into the mixing zone 134 is prevented by ensuring that its temperature is below its self-ignition temperature. Also, flashback is prevented using the techniques described above with respect to the other embodiments of the invention.

Figure 8:
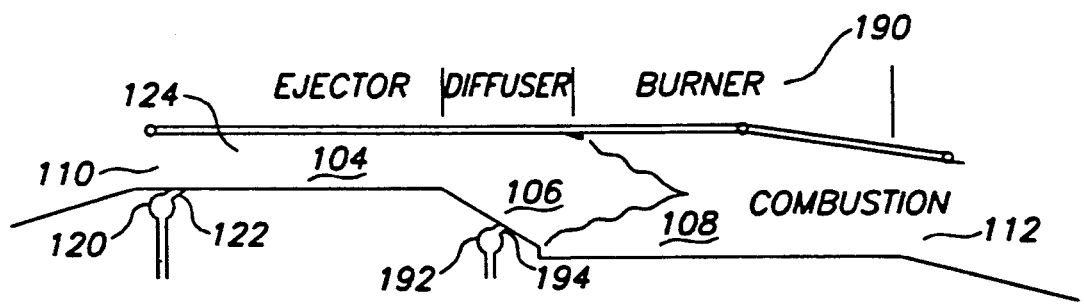
FIG. 8 is a schematic cross-sectional view of another embodiment of the inventive engine in which a highly fuel rich injectant is injected into the ramjet duct downstream of the primary injector to prevent combustion from propagating from the combustion zone to the primary injector.

A final embodiment of a ramjet engine 190 of the present invention is illustrated in FIG. 8. The engine 190 of FIG. 8 is essentially the same as the engine 100 of FIG. 3, and its components have therefore been designated with the same reference numerals. The engine 190 adds to the engine 100 of FIG. 3 a secondary injector 192 positioned at the downstream edge of the diffusion zone 106. A fuel rich mixture is injected through a nozzle 194 along the walls of the diffusion zone 106 to increase the fuel concentration of the mixture along the walls of the diffusion zone 106. This increased fuel concentration along the walls of the diffusion zone 106 reduces the combustion propagation velocity along the walls to prevent flashback.

The secondary injector 192 preferably differs from the primary injector 120 in two respects. First, the angle of the nozzle 194 has a larger downstream component to maintain more of the injectant along the wall of the diffuser zone 106. In contrast, the nozzle 122 has a smaller downstream component so that faster mixing of the injectant with the ambient air can occur. Second, the fuel rich mixture conveyed to the injector 192 should have a higher fuel concentration than the fuel rich mixture applied to the injector 120. In fact, while the mixture applied to injector 120 is a pre-combusted fuel rich mixture, the injector 192 should receive pure fuel in order to maximize the fuel concentration along the walls of the diffusion zone 106 to prevent flashback.

As explained above with reference to FIGS. 4 and 5 a high fuel concentration along the walls of the diffusion zone 106 increases the equivalence ratio to a point where the flame propagation velocity is relatively low.

The flame propagation velocity along the walls of the diffusion zone 106 can also be reduced by reducing the equivalence ratio to a value significantly less than 1, as illustrated in FIG. 5. The equivalence ratio can be adequately reduced by injecting a low fuel concentration pre-combusted oxidizer/fuel mixture from the secondary injector 192.

The basic concept of the inventive fuel-rich-ejector-combustor for other air-breathing propulsion applications which require compression followed by combustion is the same as that illustrated for the ejector-ramjet. That is, the fuel-rich ejector is followed by a diffuser with boundary layer control to prevent flashback as illustrated in FIG. 8. After diffusing to the desired larger flow area, combustion occurs and flashback to the injectors is prevented.

We claim:

1. A jet engine suitable for use in an aircraft in a range of speeds from zero to hypersonic flight, said engine comprising:
   a duct having a relatively small diameter mixing zone and a relatively large diameter combustion zone located downstream from said mixing zone;
   a primary injector having an exhaust outlet opening into said duct in said mixing zone;
   a secondary injector positioned between said primary injector and said combustion zone, said secondary injector injecting a fuel rich mixture along the wall of said duct upstream of said combustion zone, the injectant used by said secondary injector having a composition selected to create a layer of air/injectant mixture along the wall of said duct upstream from said combustion zone such that the local flame propagation speed is less than the local flow velocity and thus combustion is prevented from propagating along the wall of said duct upstream from said combustion zone; and
   supply means for supplying a fuel rich injectant to said primary injector so that said primary injector forces said injectant into said duct, said injectant being injected into said duct at a temperature below the temperature of spontaneous combustion of said injectant, said exhaust outlet of said primary injector being adapted to inject said injectant in a direction extending substantially along the length of said duct to form an ejector, the geometry of the exhaust outlet of said injector and said duct being selected to prevent combustion from propagating upstream from said combustion zone through said duct.

2. The jet engine of claim 1 wherein the fuel rich injectant injected by said secondary injector is pure hydrogen.

3. In a jet engine suitable for use in an aircraft in a range of speeds from zero to supersonic or hypersonic flight, said engine including a duct having a relatively small diameter mixing zone and a relatively large diameter combustion zone located downstream from said mixing zone, the improvement comprising:
   means for injecting a fuel rich injectant into the mixing zone of said duct in a direction extending substantially along the length of said duct, the flow velocity profile at which said fuel rich injectant is injected into said duct being adapted to prevent combustion from propagating through said duct upstream from said combustion zone; and
   means for injecting a layer of secondary fuel rich injectant between said combustion and mixing zones thereby preventing combustion from propagating along the wall of said duct upstream from said combustion zone.

4. The jet engine of claim 3 wherein the secondary fuel rich injectant injected along the wall of said duct is pure hydrogen.

* * * * *